(12) United States Patent
Aitken

(10) Patent No.: US 6,503,859 B1
(45) Date of Patent: Jan. 7, 2003

(54) MOLECULAR, INORGANIC GLASSES

(75) Inventor: Bruce G. Aitken, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/894,587

(22) Filed: Jun. 28, 2001

(51) Int. Cl.$^7$ ................................................ C03C 3/32
(52) U.S. Cl. .......................................................... 501/40
(58) Field of Search ............................................ 501/40

(56) References Cited

U.S. PATENT DOCUMENTS

| | | | | |
|---|---|---|---|---|
| 2,883,294 A | * | 4/1959 | Jerger .......................... 359/350 |
| 3,177,082 A | * | 4/1965 | MacAvoy ..................... 501/40 |
| 3,241,986 A | * | 3/1966 | Jerger .......................... 501/37 |
| 3,951,669 A | | 4/1976 | Malmendier et al. |
| 4,314,031 A | | 2/1982 | Sanford et al. ............... 501/44 |
| 4,920,078 A | * | 4/1990 | Bagley et al. ................ 257/626 |
| 4,996,172 A | | 2/1991 | Beall et al. ................... 501/45 |
| 5,021,366 A | | 6/1991 | Aitken ......................... 501/45 |
| 5,122,484 A | | 6/1992 | Beall et al. ................... 501/46 |
| 5,153,151 A | | 10/1992 | Aitken ......................... 501/45 |
| 5,256,604 A | | 10/1993 | Aitken ......................... 501/45 |
| 5,286,683 A | | 2/1994 | Aitken ......................... 501/45 |
| 5,926,599 A | | 7/1999 | Bookbinder et al. ........ 385/137 |

* cited by examiner

Primary Examiner—David Sample
(74) Attorney, Agent, or Firm—Milton M. Peterson; Vincent T. Kung

(57) ABSTRACT

The invention resides in a molecular, inorganic glass and a method of making the glass, the glass being vitreous and resistant to devitrification, that is composed, in substantial part at least, of thermally-stable, zero-dimensional clusters or molecules, composed of four atoms of arsenic and three atoms of sulfur, the glass further containing up to 12 atomic percent of germanium, adjoining clusters being bonded to each other primarily by van der Waals forces, and at least 95% of the glass composition consisting of 42–60% arsenic, 37–48% sulfur plus selenium, the selenium being 0–14%.

10 Claims, 2 Drawing Sheets $As_4S_3$ MOLECULAR CLUSTER

FIG. 1  As$_4$S$_3$ MOLECULAR CLUSTER

MOLECULAR, INORGANIC GLASSES

FIELD OF THE INVENTION

The invention relates to molecular, inorganic glasses composed, in part at least, of thermally-stable, zero-dimensional clusters, each of which is composed of arsenic and sulfur atoms and associated with germanium atoms.

BACKGROUND OF THE INVENTION

The physical structure of a glass may be characterized by its dimensionality, that is, by the number of directions in which its components extend. Thus, vitreous selenium, which is believed to consist of intertwined chains of selenium atoms, is said to have a one-dimensional structure. Likewise, glassy $AS_2S_3$, which consists of corrugated sheets of $As_2S_3$ pyramids that share corners, is described as having a two-dimensional structure. Considered in these structural terms, most oxide glasses are said to be three-dimensional.

A certain class of crystalline, inorganic compounds, known as molecular solids, have a zero-dimensional structure. This structure consists of molecular clusters in a cage-like form. As such, the clusters are repeated periodically in three dimensions, but are only bonded to each adjacent cluster by van der Waals forces. Examples of crystalline, inorganic compounds that have such a structure are known. They include arsenic sulfide, which consists of eight atom clusters designated $As_4S_4$, and phosphorous sulfide, which consists of 14 atom clusters designated as $P_4S_{10}$.

The possibility of an inorganic glass having such a structure has been suggested by R. Zallen. He has suggested that such a zero-dimensional structure may occur temporarily in amorphous arsenic sulfide films which have been fabricated by vapor-phase deposition. Although such structure is found in these films initially upon cooling, it is thermally unstable in that it is lost upon annealing the films.

The present invention is based on discovery that bulk, inorganic glasses can be produced that consist almost entirely of thermally-stable, zero-dimensional clusters. These novel glasses have some physical properties similar to those observed in organic plastics. However, they also exhibit other properties that more closely resemble those found in conventional, three-dimensional, inorganic glasses such as complete transparency between the visible and infrared cutoff wavelengths. These unique glasses are hereafter described in greater detail.

SUMMARY OF THE INVENTION

The invention resides in part in a molecular, inorganic glass that is resistant to devitrification, that is constituted, in part at least, of thermally-stable, i.e., persisting after annealing, zero-dimensional clusters or molecules composed of four atoms of arsenic and three atoms of sulfur, that, optionally, contains up to 12% of germanium atoms, the clusters being bonded to each other primarily by van der Waals forces, and wherein at least 95% of the composition consists essentially of, on an atomic percent basis, 42–60% arsenic (As), up to 48% sulfur (S), 0–14% selenium (Se), the content of S+Se being 37–48%, and, optionally, up to 12% germanium (Ge).

The invention further resides in a method of producing a thermally-stable, As–S glass that is composed, in part at least, of zero-dimensional clusters or molecules composed of four atoms of arsenic and three atoms of sulfur, the method comprising forming a mixture of 42–60% arsenic, 37–48% S+Se wherein the Se is 0–14%, with, optionally, up to 12% germanium (Ge), and melting the mixture to form a devitrification-resistant, inorganic glass melt.

The term "atomic percent," as used herein, represents the actual percent of the total number of atoms present. Thus, the value given for a particular element represents the percent of atoms of that element present in a composition as compared to 100 percent for the total number of atoms in the composition.

DESCRIPTION OF THE DRAWINGS

In the accompanying drawings.

DESCRIPTION OF THE INVENTION

The present invention is based on discovery of bulk glasses that contain thermally-stable, zero-dimensional, atomic clusters or molecules, and that may be almost entirely composed of such clusters. These unique materials exhibit some properties similar to those found in ordinary, organic plastics. However, they also possess property values comparable to those observed in conventional, inorganic glasses having three dimensional structures. Therefore, these unique glasses are termed "plastic glasses."

Figure 1:
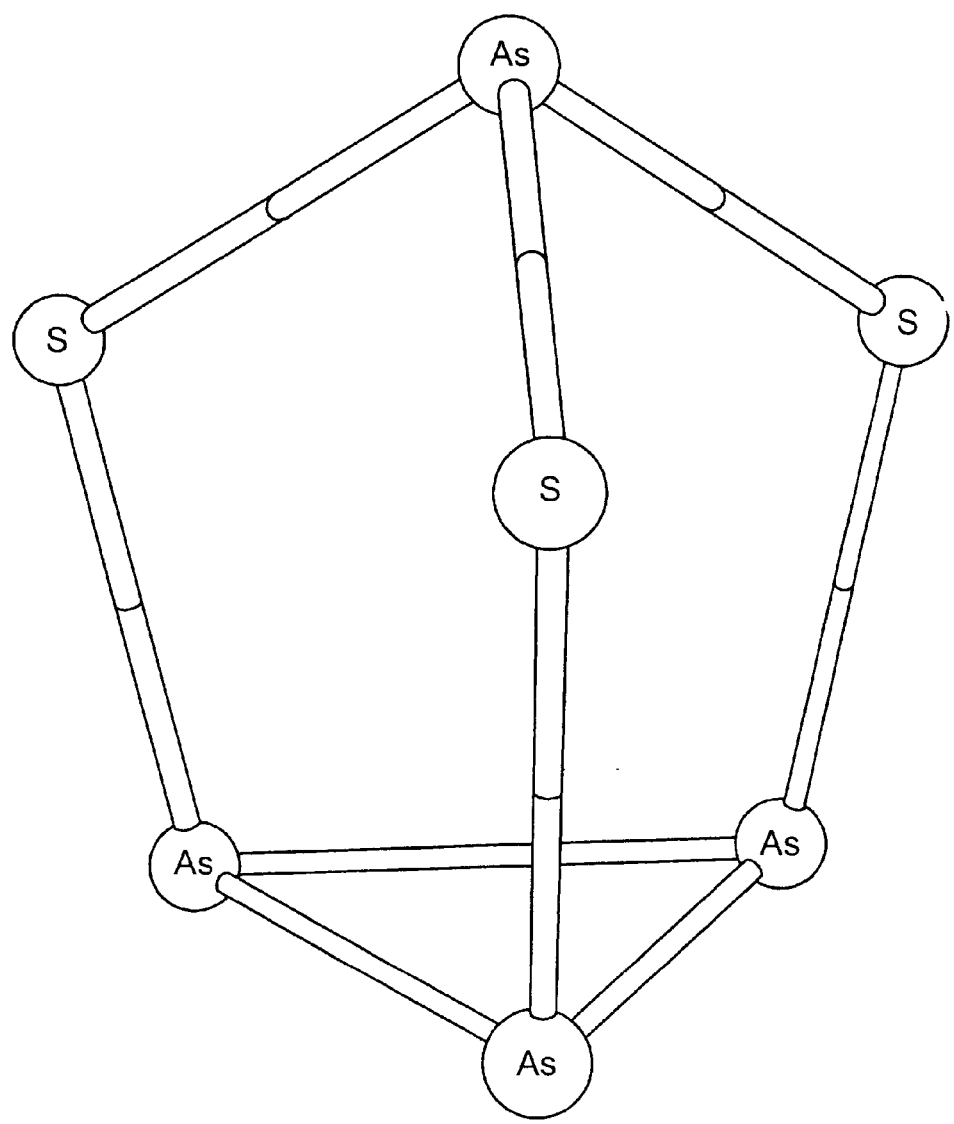
FIG. 1 is a schematic representation of an $As_4S_3$ molecular cluster in accordance with the invention.

The characteristic clusters of atoms in the present glasses are composed of four (4) arsenic atoms and three (3) sulfur atoms. The cage-like manner in which these seven (7) atoms are believed to be arranged is shown in FIG. 1 of the accompanying drawing. The structure, as shown, extends in three directions. However, the clusters exist independently, except as they are bonded by van der Waals forces.

The role of germanium in the present glasses is not clear. It is not known whether or not the germanium atom actually enters the $As_4S_3$ cluster as such. In any event, it appears to be closely associated with the $As_4S_3$ cluster and is influential in the observed properties of the glasses.

Glass formation in the GeAsS system is, of course, well known. However, the present compositional area lies outside known glass-forming regions. Intermediate these regions is a narrow region in which compositions may be melted, but in which they tend to phase-separate, or spontaneously crystallize, on cooling.

The present, inventive, plastic glasses have an electronic absorption edge that lies at a shorter wavelength than that of known GeAsS glasses with comparable sulfur content. This characteristic results in the plastic glasses possessing unexpectedly broad, visible transparency. For example, the absorption edge of known GeAsS glass containing 45% sulfur lies at wavelengths in excess of 700 nm., whereas that of a plastic glass with the same sulfur content occurs at 620 nm.

TABLE I, below, sets forth, in atomic percent, several compositions which are illustrative of glasses in which the atoms substantially completely occur in clusters, as illustrated in FIG. 1. Also shown in the TABLE are the exceptionally low Tg temperatures that characterize these glasses, as well as the softening point ($T_s$), density, electrical resistivity (log p) and coefficient of thermal expansion data (CTE) values measured on the glasses. The latter are exceptionally large, being among the highest values observed in inorganic glasses.

TABLE I

| Element | 1 | 2 | 3 | 4 | 5 | 6 | 7 | 8 | 9 | 10 | 11 |
|---|---|---|---|---|---|---|---|---|---|---|---|
| Ge | 3 | 1.3 | 2.5 | 1.3 | 1.3 | 2.5 | 3 | 3 | 3 | 5 | 1.3 |
| As | 52 | 55 | 55 | 58.7 | 53.7 | 51.3 | 52 | 52 | 52 | 50 | 56.2 |
| S | 45 | 43.7 | 42.5 | 40 | 45 | 46.2 | 40.5 | 31.5 | 36 | 45 | 42.5 |
| Se | — | — | — | — | — | — | 4.5 | 13.5 | 9 | — | — |
| Tg° C. | 39 | 19 | 42 | 21 | 14 | 34 | 43 | 54 | 45 | 51 | 29 |
| Density | 3.42 | 3.43 | 3.49 | 3.44 | 3.40 | 3.39 | — | — |  | 3.42 | 3.47 |
| CTE × $10^{-7}$/° C. | 958 |  |  |  |  |  |  |  |  |  |  |
| Ts | 68 |  | 85 |  |  | 49 | 78 |  | 79 |  | 49 |
| log p | 133 |  |  |  |  |  |  |  |  |  |  |

These glasses have very low Tg values that are below 100° C., and generally no greater than 50° C. Since some of the values are below an ambient temperature of about 25° C., the corresponding glass can be deformed plastically at normal room temperatures. In general, these glasses are very durable. For example, a sample of glass 1 in TABLE I was soaked in water at room temperature for six months without showing any weight loss. The glass is also resistant to acid attack, and to devitrification.

These glasses are composed essentially of 46–60% arsenic (As), 39–48% sulfur (S) plus selenium (Se), the selenium being 0–14%, and, optionally, up to 6% germanium (Ge). A particularly preferred range of compositions, which includes preferred compositions 1 and 6, consists essentially of 48–54% As, 44.5–47.5% S and 1.5–4.5 Ge.

A 36 gram batch was mixed in accordance with the proportions of Example 1 in TABLE I. The batch was sealed within an evacuated, fused silica ampoule and melted at 800° C. for 40 hours. The melt was initially quenched by plunging the ampoule into water. The resultant glass was cooled slowly from 200° C. to room temperature (25° C.) with no sign of devitrification. The glass rod thus produced was then reheated in air to 100° C., about 30° C. above the glass softening point, and cooled. Again, no sign of crystallization was observed.

The plastic glass of Example 1 was completely transparent in the near infra-red (IR). In contrast to organic polymers, it showed no discrete absorption peaks, other than impurities, between its visible absorption edge near 600 nm and the IR edge at about 12 μm. In further contrast to organic polymers, this glass tends to be quite impermeable.

In addition to the plastic glasses just described, wherein the $As_4S_3$ clusters essentially constitute the glass, an adjacent compositional area has been identified in which the $As_4S_3$ structure is prominent.

Glasses in this adjacent compositional area, having higher Tg values over 100° C., are composed essentially of 42–60% arsenic (As), 37–48% sulfur (S) plus selenium (Se), the selenium being 0–14%, and 5–12% germanium (Ge).

These glasses, as might be expected, have substantially larger Tg values, generally over 100° C. In contrast, glasses, where the $As_4S_3$ cluster structure essentially constitutes the entire glass, have a Tg under 100° C., and generally below 50° C.

TABLE II shows examples of these transitional, or modified, glass compositions. Also, the Tg, density and CTE values are presented. As is apparent, the Tg values are significantly higher, while the CTE values are lower. These glasses are batched and melted in the same manner as those in TABLE I above.

TABLE II

| Element | 12 | 13 | 14 | 15 |
|---|---|---|---|---|
| Ge | 7.5 | 5 | 5 | 10 |
| As | 52.5 | 55 | 52.5 | 45 |
| S | 40 | 40 | 42.5 | 45 |
| Tg° C. | 202 | 192 |  | 220 |
| Density | 3.52 |  | 3.43 |  |
| CTE × $10^{-7}$/° C. | 405 |  |  |  |
| Ts | 329 |  |  |  |

Figure 2:
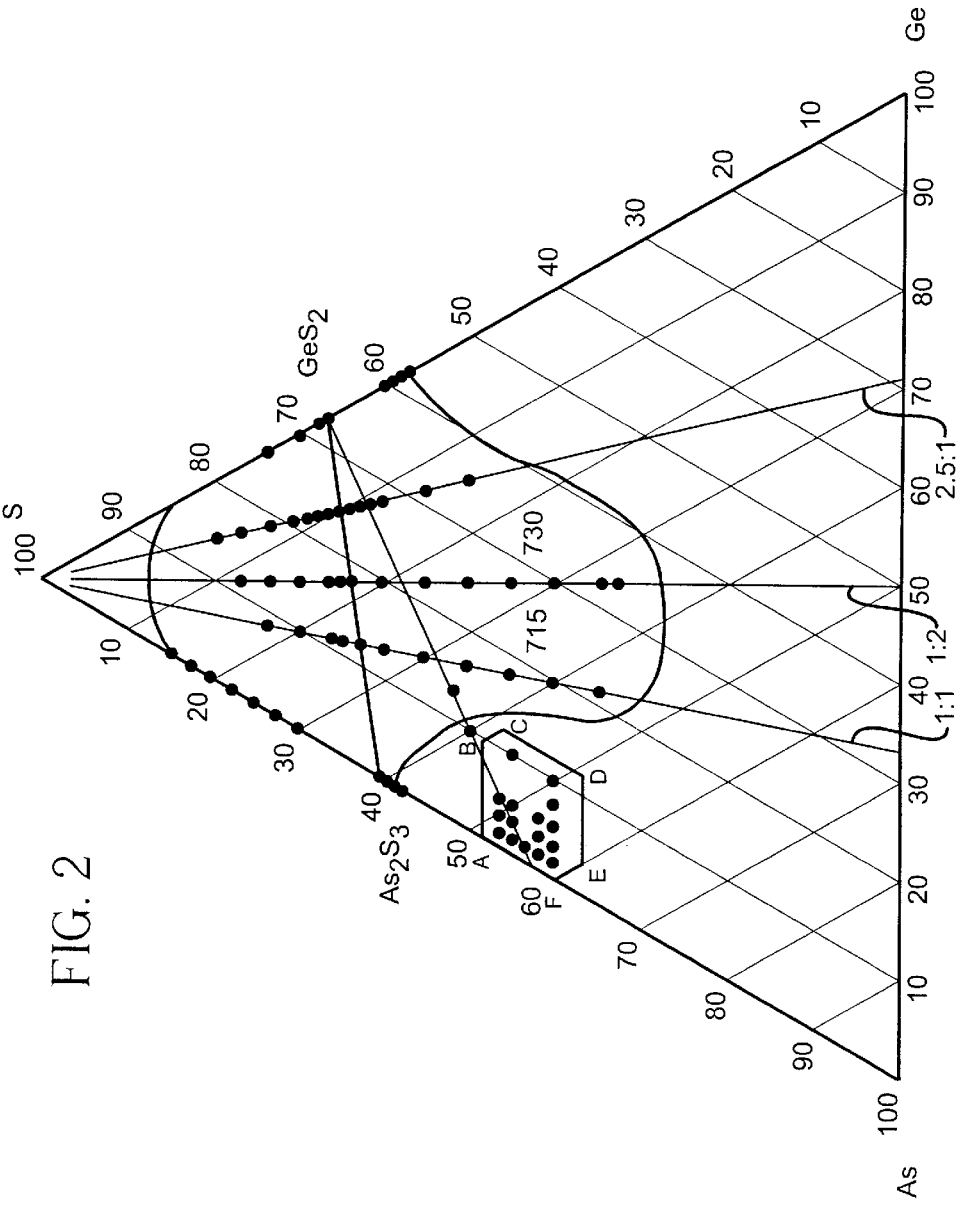
FIG. 2 is a ternary diagram showing the compositional area in accordance with the invention.

FIG. 2 is a ternary diagram showing the total compositional area for glasses in accordance with the present invention. In the diagram, the apex, labeled S, represents 100% S; the right end of the base line, labeled Ge, represents 100% Ge; the left end of the base line, labeled As, represents 100% As. Glass compositions in accordance with the present invention are included within the area labeled ABCDEF. As noted earlier, the plotted values are in terms of atomic percent, that is the actual percent of the total number of atoms present represented by each element.

In terms of composition, glasses in accordance with the present invention consist essentially of 42–60% As, 37–48% S and up to 12% Ge. Up to about 30% of the sulfur content may be replaced by selenium, that is an amount up to about 14% Se. Attempts to substitute tellurium for sulfur, tin for Ge, and phosphorus or antimony for arsenic have been largely unsuccessful. The melts have tended to result in crystallized materials if such alternative additives exceed about 5% in total. Individually, these optional ingredients must not exceed 5% tellurium, 2% tin, 5% antimony, and 2.5% phosphorus, the total collectively not exceeding 5%.

The unusual properties of these new glasses, particularly their low Tgs and softening points, render them candidates for a variety of potential applications. These range from moldable lenses to durable sealing glasses to a host material for unstable, inorganic dyes.

I claim:

1. A molecular, inorganic glass that is resistant to devitrification, that is composed in substantial part at least, of thermally-stable, zero-dimensional clusters, each cluster composed of four atoms of arsenic and three atoms of sulfur, adjoining clusters being bonded to each other primarily by van der Waals forces, and wherein at least 95% of the glass composition consists essentially of, in atomic percent, 42–60% arsenic, 37–48% sulfur plus selenium, the selenium being 0–14%, and optionally up to 12 atomic percent germanium.

2. A molecular, inorganic glass in accordance with claim 1 that has a Tg not over 100° C. and that consists essentially of 46–60% arsenic, 39–48% sulfur plus selenium, the selenium being 0–14%, and up to 6% germanium.

3. A molecular, inorganic glass in accordance with claim 2 that consists essentially of 48–54% As, 44.5–47.5% S and 1.5–4.5% Ge.

4. A molecular, inorganic glass in accordance with claim 1 that has a Tg greater than 100° C., and that consists essentially of 42–60% arsenic, 37–48% sulfur plus selenium, wherein the selenium content is 0–14%, and the germanium content is 5–12%.

5. A molecular, inorganic glass in accordance with claim 1 which optionally contains not over 5% tellurium (Te), not over 2% tin (Sn), not over 5% antimony (Sb) and not over 2.5% phosphorus (P), the total content of these optional components not exceeding 5%.

6. A method of producing a thermally-stable, devitrification-resistant, As–S glass that is composed, in part at least, of zero-dimensional clusters composed of four atoms of arsenic and three atoms of sulfur, the method comprising forming a mixture of, in terms of atomic percent, 42–60% arsenic, 37–48% sulfur plus selenium wherein the selenium is 0–14% and the sulfur up to 48%, and, optionally, up to 12% germanium, and melting the mixture to form a devitrification-resistant, inorganic glass melt.

7. A method in accordance with claim 6 which comprises forming a mixture of 46–60% arsenic, 39–48% sulfur plus selenium, the selenium being 0–14%, and up to 6% germanium.

8. A method in accordance with claim 7 which comprises forming a mixture of 48–54% As, 44.5–47.5% S and 1.5–4.5% Ge.

9. A method in accordance with claim 6 which comprises forming a mixture of 42–60% arsenic, 37–48% sulfur plus selenium, where the selenium is 0–14% of the mix, and the germanium content is 5–12%.

10. A method in accordance with claim 6 which comprises optionally including in the mixture not over 5% tellurium (Te), not over 2% tin (Sn), not over 5% antimony (Sb) and not over 2.5% phosphorus (P), the total content of these optional components not exceeding 5%.

* * * * *